United States Patent [19]

Blevitt et al.

[11] 4,047,623

[45] Sept. 13, 1977

[54] MODULE LOADING DEVICE

[75] Inventors: Robert Blevitt; Miguel Eugene O'Brien, both of Santa Barbara, Calif.

[73] Assignee: Ajax International Corporation, Santa Barbara, Calif.

[21] Appl. No.: 604,136

[22] Filed: Aug. 13, 1975

[51] Int. Cl.$^2$ .................. B66F 1/00; B01D 31/00
[52] U.S. Cl. .................. 214/17 C; 210/236; 210/433 M; 403/373
[58] Field of Search ............ 214/17 C, 17 A, 17 B, 214/1 P, 23; 210/321 R, 236, 433 M; 89/45, 46, 47; 403/310, 313, 373; 285/420

[56] References Cited

U.S. PATENT DOCUMENTS

| 2,901,271 | 8/1959 | Zoldak | 285/420 |
| 2,975,903 | 3/1961 | Ulrich | 210/236 |
| 3,567,044 | 3/1971 | Travis | 214/1 P |
| 3,722,694 | 3/1973 | Agranat | 210/433 M |
| 3,774,771 | 11/1973 | Manjikian et al. | 210/321 R |

Primary Examiner—Trygve M. Blix
Assistant Examiner—Charles E. Frankfort
Attorney, Agent, or Firm—LeBlanc & Shur

[57] ABSTRACT

Disclosed is a device for loading and unloading modules relative to a pressure vessel and utilized in reverse osmosis systems. The device includes an elongated support for receiving the modules, a fluid actuated cylinder located at one end of the support and a clamp at the opposite end of the support for clamping the support to the open end of the pressure vessel. As each module is disposed on the support, the cylinder is actuated to extend its piston whereby the piston head displaces the module along the support into the open end of the pressure vessel. Additional modules are similarly loaded into the pressure vessel whereby the modules are serially arranged within the pressure vessel. To unload the modules from the pressure vessel, a rod is disposed between the piston head and the first module and the fluid actuated cylinder is actuated to displace all of the modules in the pressure vessel axially toward its opposite open end whereby the module first disposed into the pressure vessel is first unloaded therefrom. Additional rods are utilized to successively unload the modules from the opposite end of the pressure vessel, the near ends of the rods nesting one into the other, with each rod having a pair of centering plates to maintain it axially aligned in the pressure vessel and with the center pipe of the modules.

12 Claims, 8 Drawing Figures

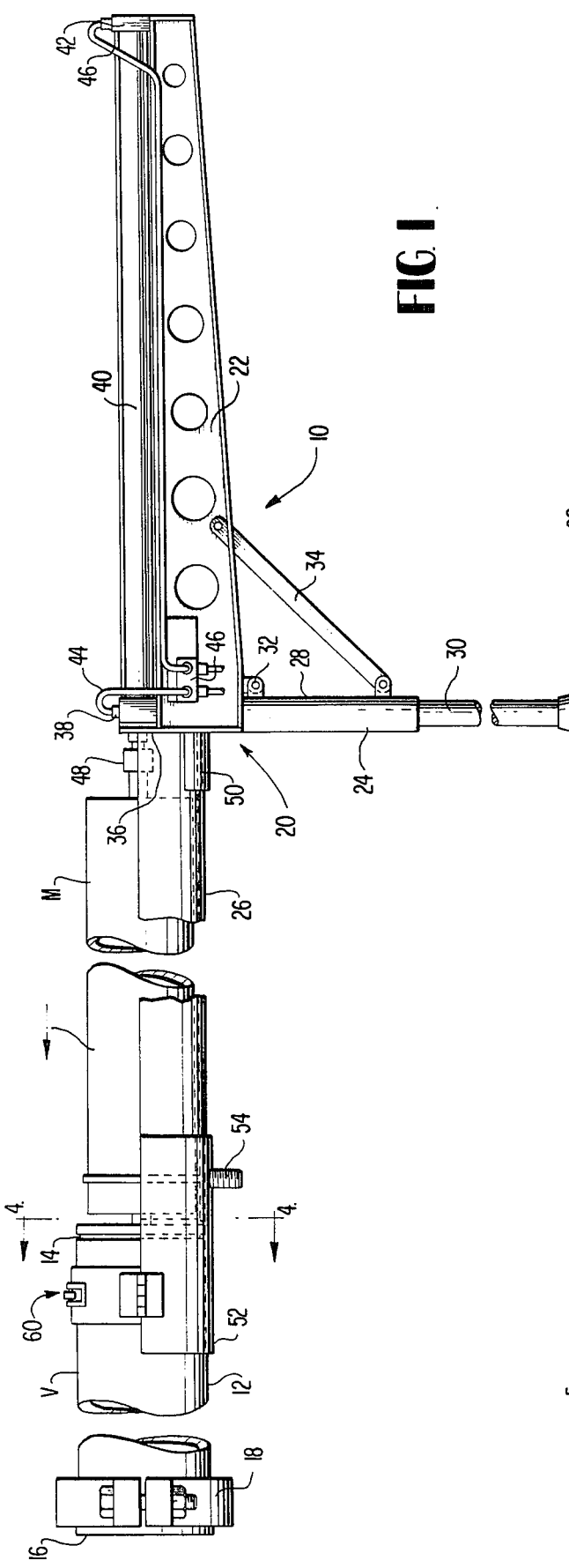
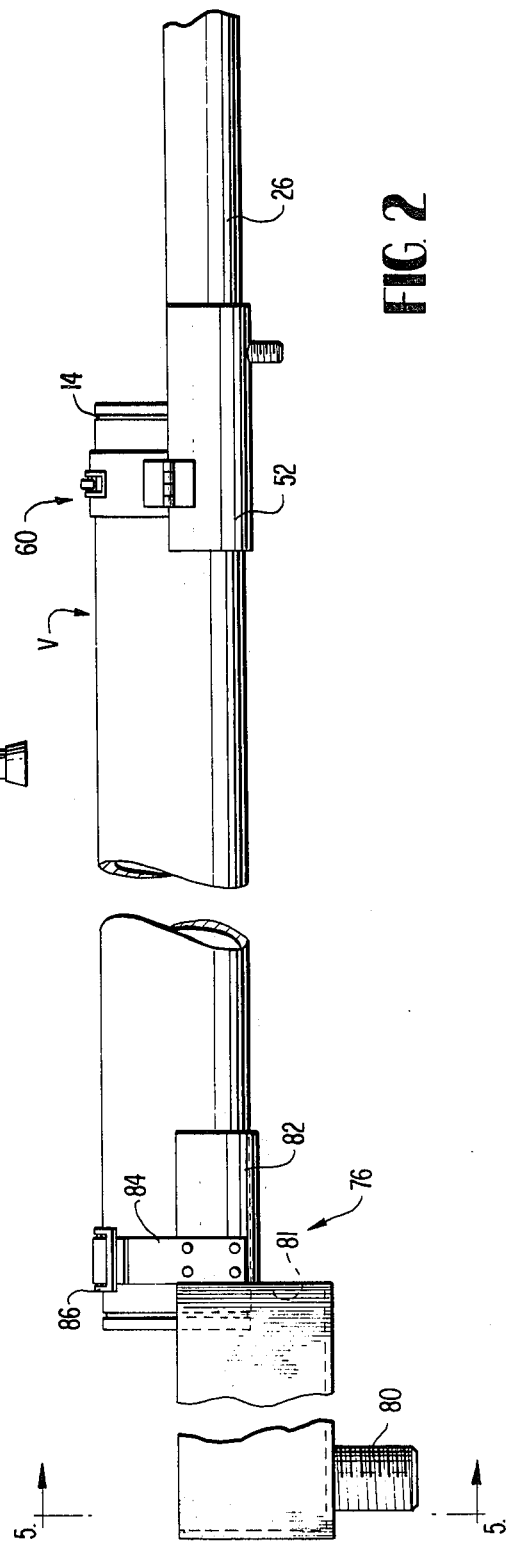

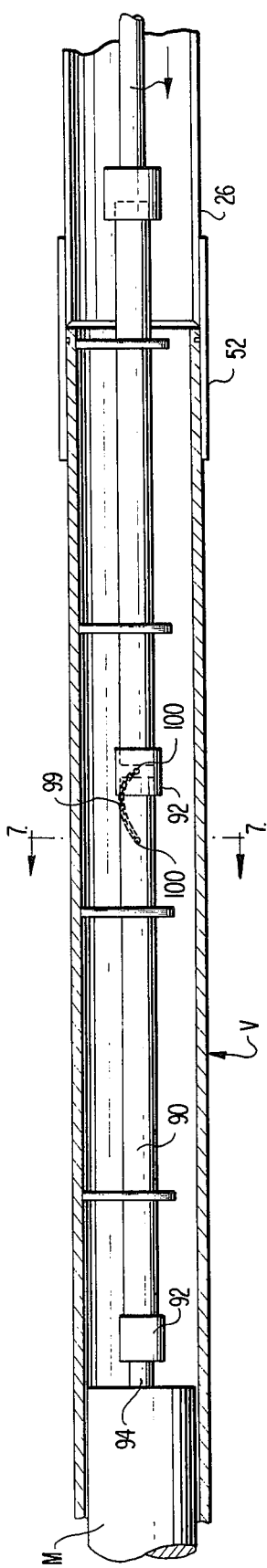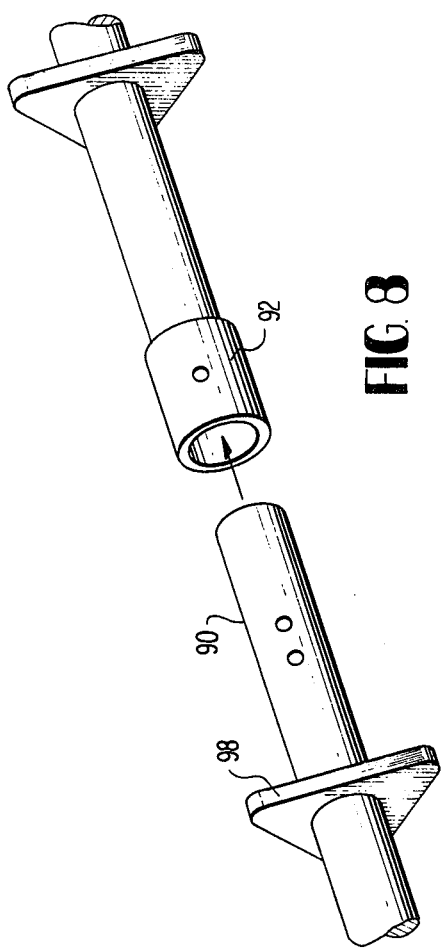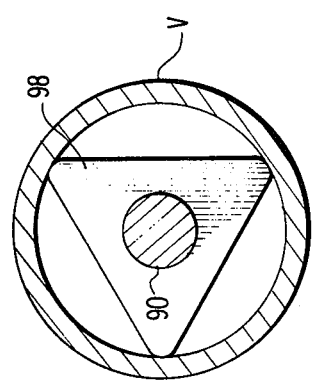

MODULE LOADING DEVICE

The present invention relates to a material handling device and particularly relates to a device for loading modules into a pressure vessel and unloading the modules from the vessel in reverse osmosis systems. Reverse osmosis is one of the many techniques utilized for purifying water. In a reverse osmosis system, pressure greater than the natural osmotic pressure, when applied to a concentrated solution in a compartment separated from an adjacent compartment by a semi-permeable membrane, results in a reverse osmotic process, i.e. an increase in the volume of fresh water in the adjacent compartment and a more concentrated solution in the first mentioned compartment. In a typical reverse osmosis system, an elongated generally cylindrical pressure vessel is provided in which a plurality of generally cylindrical modules are serially disposed, each module having a semi-permeable membrane. Feed water containing dissolved solids enters the vessel under pressure and reverse osmosis forces purified water through each membrane ultimately to a perforated pipe in the center of the module. The pipes of each module are connected end-to-end and pure water flows from an outlet at the end of the pressure vessel. The concentrated solution also flows from the pressure vessel through an outlet. Thus, feed water continuously flows into the pressure vessel while the discrete purified water product and concentrate continuously flow from the pressure vessel.

In such typical reverse osmosis system, each module is sealed about its periphery to the internal surface of the pressure vessel. Individually, the modules can weigh 45-50 pounds and, considering their seals, can be very difficult to insert into the pressure vessel as well as axially displace along the pressure vessel either when loading the modules into the pressure vessel or unloading them from the pressure vessel. As a result, the modules are, in practice, very difficult to load and unload relative to the pressure vessel. In fact, experience has shown that at least two men are required in order to exert sufficient axial pressure to displace even one module from a pressure vessel in a six-module reverse osmosis system.

The present invention is therefore directed to a novel and improved module handling device for use in connection with reverse osmosis systems of the type utilizing cylindrical modules disposable in elongated cylindrical pressure vessels. More particularly, the present vessel relates to a module handling device having an elongated support or trough carried on a frame which also mounts a fluid actuated cylinder at one end of the trough. At the opposite end of the support there is carried a clamp for releasably clamping the opposite end of the support to an open end of the pressure vessel. By actuating the fluid actuated cylinder, the piston head carried thereby engages the module on the support and displaces it forwardly into the open end of the pressure vessel. Succeeding modules are likewise loaded into the pressure vessel with the cylinder being actuated for each module loading cycle. To unload the pressure vessel after use, a rod is disposed between the piston head and the near end of the module last loaded into the pressure vessel. Upon actuation of the fluid actuated cylinder, the rod displaces all of the modules in the pressure vessel forwardly with the end module dropping into a trough secured to the pressure vessel at its opposite end. Additional rods, which are each nested within the rear end of a preceding rod, are disposed over the support between the piston head and such preceding rod and are advanced in sequence upon successive actuation of the cylinder whereby additional modules are sequentially unloaded from the pressure vessel.

A feature of the present invention resides in the clamping of the module handling device to the pressure vessel. Pressure vessels of this type are normally provided with a groove about their ends and which groove, during operation of the reverse osmosis system, cooperates with a split clamp to secure an end cap to the pressure vessel. When the cap is removed and the module handling device is moved into position to load or unload the modules, the groove about the open end cooperates with a radial projection carried by the module handling device and in conjunction with its clamp serves to retain the module handling device coupled to the pressure vessel notwithstanding the action of the fluid actuated cylinder which tends to separate the module handling device and the pressure vessel.

Accordingly, it is a primary object of the present invention to provide a novel and improved module handling device for loading and unloading the pressure vessels in reverse osmosis systems.

It is another object of the present invention to provide a novel and improved module handling device for loading and unloading pressure vessels in reverse osmosis systems and which provides a mechanical advantage during both loading and unloading.

It is still another object of the present invention to provide a novel and improved module handling device for use in reverse osmosis systems wherein the device and each pressure vessel of the reverse osmosis system cooperate one with the other to prevent their relative displacement during module loading or unloading operations.

It is a further object of the present invention to provide a novel and improved module handling device for reverse osmosis sytems which is relatively inexpensive to manufacture and utilize and which substantially eliminates manual handling of the modules and their manual displacement along the pressure vessel.

These and further objects and advantages of the present invention will become more apparent upon reference to the following specification, appended claims and drawings wherein:

FIG. 1 is a side elevational view with parts broken out for ease of illustration of a module handling device constructed in accordance with the present invention and which device is illustrated secured to a pressure vessel in position for loading a module into the pressure vessel;

FIG. 2 is a side elevational view of the module handling device, the pressure vessel and a trough, the trough being disposed on the outlet end of the pressure vessel for use in unloading modules from the pressure vessel;

FIG. 6 is a horizontal cross-sectional view illustrating the alignment of rods within the pressure vessel for unloading the modules therefrom;

FIG. 7 is an enlarged cross-sectional view taken generally about on line 7—7 in FIG. 6; and FIG. 8 is a perspective view illustrating the connection between the rods utilized in unloading the modules from the pressure vessel.

Figure 3:
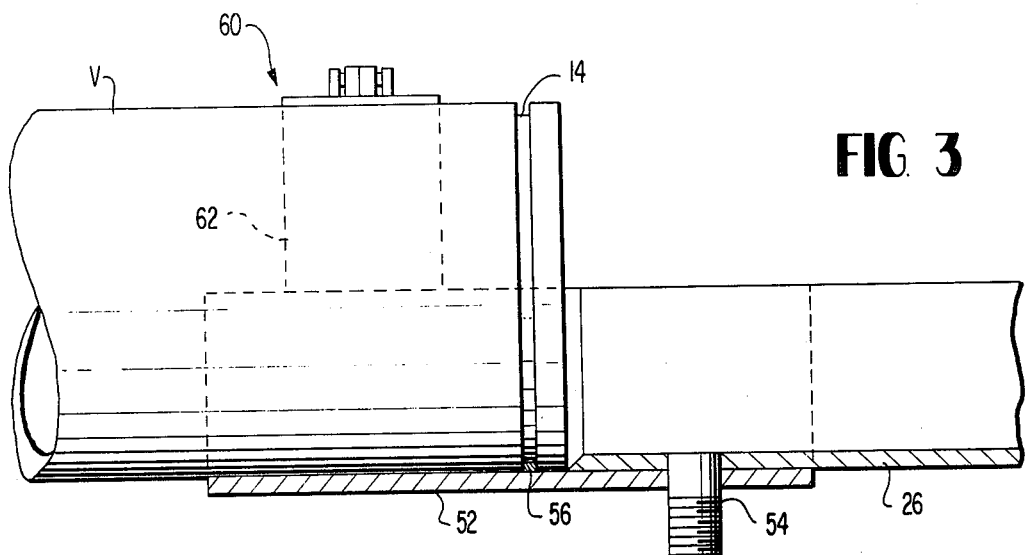
FIG. 3 is an enlarged fragmentary cross-sectional view illustrating the connection between the module handling device hereof and the pressure vessel.
Figure 4:
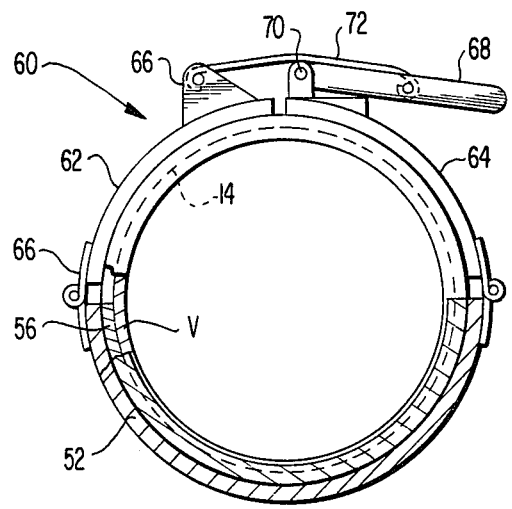
FIG. 4 is a cross-sectional view thereof taken generally about on lines 4—4 in FIG. 1.

Referring now to FIG. 1, there is illustrated a module handling device constructed in accordance with the present invention and generally designated 10, a pressure vessel designated V, and a module M in position on the module handling device 10 for loading into the pressure vessel V. Before describing the module handling device 10, a brief description of a conventional pressure vessel for use in a reverse osmosis system will be set forth to facilitate understanding of module handling device 10. The pressure vessel V comprises an elongated cylindrical tube 12 open at its opposite ends and having an annular groove 14 about each of its opposite ends at axial locations set back slightly from the distal ends of pressure vessel V. When in use, an end cap closes each of the opposite ends of the pressure vessel with the modules M disposed serially within vessel V, an end cap being illustrated at 16 in FIG. 1. Each end cap is normally retained on the pressure vessel by a split clamp 18 which cooperates with the groove 14 and an annular shoulder, not shown, on end cap 16 to retain the cap 16 in sealing engagement about the end of the pressure vessel. The end cap at the inlet end of the pressure vessel is provided with a conduit for flowing feed water into the pressure vessel while the end cap at its opposite end is provided with a pair of conduits for flowing the purified water product and concentrate, respectively, from the pressure vessel.

Referring now to module handling device 10 as illustrated in FIG. 1, it includes a frame 20 comprised of an elongated beam 22, a support stanchion or pipe 24, and an elongated support or trough 26 secured at one end to an end of beam 22. Stanchion 24 includes a pair of telescoping tubes 28 and 30 whereby stanchion 24 is adjustable to selected heights by means not shown. Stanchion 24 is pivotally secured to the underside of beam 22 at 32 and a support brace 34 interconnects beam 22 and stanchion 24, the connection being made by pins, one of which is removable whereby brace 34 can be disconnected from beam 22 and stanchion 24 folded under the beam 22 for storage with such removable pin being reinsertable in brace 34 and another opening, not shown, in beam 22 to retain stanchion 24 in its folded stored position. At the forward end of beam 22, there is provided an upstanding plate 36 to which a mounting block 38 for a fluid actuated, preferably hydraulic, cylinder 40 is secured. The opposite end of cylinder 40 carries a mounting block 42 and fluid lines 44 and 46 are coupled to respective mounting blocks 38 and 42, which communicate with opposite ends of the cylinder, and to a valve 46 whereby the piston, carried by cylinder 40, the head of which is indicated 38, can be extended or retracted along support 26.

Support 26 constitutes a longitudinal section of a cylinder taken along its diameter and is suitably secured to the upstanding plate 36. Support 26 is additionally supported by an arcuate plate 50 also secured to plate 36. The opposite end of support 26 carries a semicylindrical extension 52, one end of which overlaps and is suitably secured to the end of trough 26. Extension 52 has a radius slightly greater than the radius of pressure vessel V whereby the end of the latter is receivable within extension 52 with its end butting the end of support 26 as illustrated in FIG. 3. A drain 54 extends through extension 52 and the end of trough 26 for reasons described hereinafter. A radially inwardly extending flange 56 is formed about the inner surface of extension 52 in a diametrical plane at a location spaced forwardly of the end of support 26 a distance such that flange 56 can be received within groove 14 of pressure vessel V when the latter lies in extension 52 with its end butted against the end of support 26. Flange 56 may be formed of tubing formed in a semicircle and suitably secured for example by welding along the interior surface of the extension 54. To releasably secure the module handling device 10 to the open end of pressure vessel V, handling device 10 is provided with a clamp generally designated 60 including a pair of clamp or hinge sections 62 and 64 suitable secured to the opposite sides of extension 52 by hinges 66. The hinge sections 62 and 64 extend as quadrants of a circle and overlie the end of pressure vessel V when the latter lies in extension 52. An overcenter toggle clamp is provided for releasably securing hinge sections 62 and 64 one to the other and clamping the pressure vessel V to extension 42 and includes a pair of brackets 66 and a handle 68 mounted on adjacent ends of sections 62 and 64 respectively. Handle 68 is pivoted at 70 and a connecting link 72 is pivotally secured between bracket 66 and to handle 68 on the side of hinge 70 remote from bracket 66. Consequently, it will be appreciated that by displacing handle 68, overcenter from its illustrated position, clamp sections 62 and 64 will pivot about their hinge axis 66 from the illustrated closed clamp position to an open clamp position enabling removal of the module handling device from the end of the pressure vessel.

Figure 5:
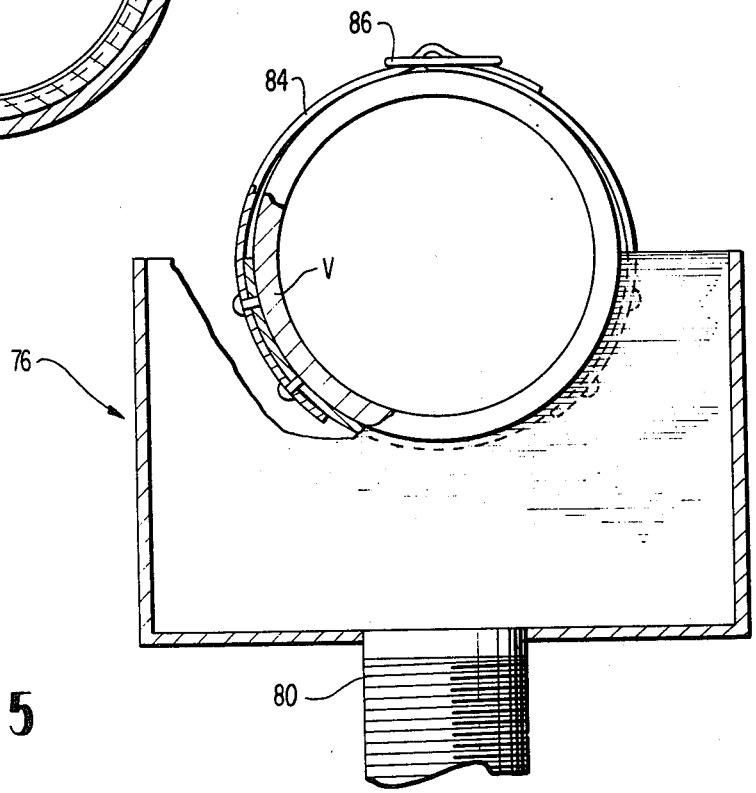
FIG. 5 is a cross-sectional view taken generally about line 5—5 in FIG. 2.

Referring now to FIG. 5, there is illustrated an unloading trough generally designated 76 for securement on the opposite end of the pressure vessel V and for use during module unloading operations. Trough 76 comprises a substantially rectangular box open at its top and having a drain pipe 80 secured to its bottom. An end wall 81 is arcuately shaped for securement to one end of an arcuate extension 82 which, in turn, receives pressure vessel V. Webbing 84 is secured about extension 82, for example by rivets, and the opposite ends of webbing 84 terminate in a buckle arrangement indicated at 86 to secure the unloading trough to the opposite end of the pressure vessel during unloading operations as described hereinafter.

Referring now to FIGS. 6–8, there is illustrated a pushrod assembly for use during module unloading operations as described hereinafter. Particularly, each pushrod 90 has an enlarged coupling 92 at its forward end in which coupling is received the feed water inlet conduit 94 of a module or the trailing end of a preceding pushrod 90. It will thus be appreciated that a series of pushrods 90 can be aligned end-to-end with the trailing end of each preceding pushrod being received in the coupling 92 at the forward end of the next adjacent succeeding pushrod. Each pushrod 90 is preferably of a length substantially the same as the length of the particular modules with which the module handling device hereof is utilized and includes a pair of triangularly shaped plates 98 spaced axially one from the other. Plates 98 are utilized to center the rods 90 within pressure vessel V in line with the feed water inlet connection of the modules as well as in alignment with preceding and succeeding rods.

To load one or more modules M into the pressure vessel V, the end caps 16 of the pressure vessel are removed by removing the split clamps 18. The module handling device 10 is then moved into place such that extension 52 receives an end portion of the pressure vessel with the radial flange 56 of extension 52 received in groove 14 of the pressure vessel and the end of the pressure vessel V butted against the end of trough 26. Clamp handle 68 is then moved overcenter whereby hinge sections 62 and 64 clamp the end portion of pressure vessel V against extension 52 with the flange 56 preventing relative endwise displacement of the pressure vessel and support 26. A first module M is then disposed in support or trough 26 and its inlet connection is engaged by the coupling 48 on the end of the piston of cylinder 40. Cylinder 40 is then actuated and the module is displaced forwardly into the open end of pressure vessel V. When the piston is retracted, another module is disposed in support 26 and the cylinder 40 is again actuated to displace the module forwardly into the open end of the vessel V with the latter module also advancing the first module disposed in the pressure vessel. Subsequent modules are loaded similarly and, when fully loaded, clamp 60 is released and the module handling device is removed from the pressure vessel.

To unload modules from a pressure vessel, the module handling device 10 is secured about the end of the pressure vessel, similarly as in loading the pressure vessel, and trough 76 is strapped about the end of the pressure vessel. The end caps are removed and a first pushrod 90 is disposed between the inlet connection of the module nearest module handling device 10 and the head 48 on the cylinder's piston. Upon actuation of the cylinder, the pushrod is displaced into the vessel displacing all of the modules within the vessel forwardly a distance substantially equal to the length of an individual module. Thus, the module at the opposite end of the vessel is displaced from the vessel. A second pushrod is then aligned between the end of the preceding pushrod and the coupling 48 on the piston and the cylinder is again actuated whereby the second pushrod is advanced into the pressure vessel thereby again axially displacing all modules within the pressure vessel and displacing a second module from the pressure vessel at its opposite end. It will be appreciated that the brackets 98 center the rods 90 within the pressure vessel whereby the couplings can be readily aligned with the ends of the rods and the feed connection as necessary. Addditional pushrods are disposed as described previously and the operation is repeated until all of the modules are displaced from the pressure vessel. The drains 80 and 54 are provided with threads for suitable connection to conduits whereby residual water in the pressure vessel can be drained when the end caps are removed from the pressure vessel and the modules are displaced therefrom.

To enable withdrawal of the pushrod assemblies, rods 90 are additionally connected one to the other by a series of chains. For example, chain 99 having pins 100 at opposite ends are coupled between the nested ends of adjacent rods by inserting pins 100 into suitable diametrical openings formed in the near ends of such rods. In this manner, the rods can be withdrawn from the pressure vessel after all of the modules have been removed.

It will thus be appreciated that there has been provided a simple practical module handling device for loading and unloading modules relative to a pressure vessel. The device eliminates all of the strenuous manual labor involved in lifting and transporting the modules into and removing the modules from the pressure vessel and particularly eliminates the necessity of attempting to manually displace a series of modules within the pressure vessel. Also, it will be appreciated that the module handling device can be readily connected to and disconnected from the pressure vessel whereby it can be readily used in conjunction with additional pressure vessels in multi-vessel systems.

The invention may be embodied in other specific forms without departing from the spirit or essential characteristics thereof. The present embodiment is therefore considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for loading modules into a pressure vessel having at least one open end with a groove thereon adjacent said end comprising a frame, an elongated support carried by said frame for receiving a module, a pusher element carried by said frame for movement between a first position adjacent one end of said support and a second position adjacent the opposite end of said support, said element adapted to push a module along said support from the first to the second position, means for coupling the opposite end of said support to the pressure vessel at the open end thereof, said coupling means including a flange carried by said support and engageable in said groove to prevent relative endwise movement of said support and the pressure vessel, and means for moving said pusher element from said first position to said second position to move the module along said support and into the pressure vessel at its open end.

2. Apparatus according to claim 1 wherein said means for moving said pusher element includes a cylinder carried by said frame, said cylinder containing a fluid actuated piston.

3. Apparatus according to claim 2 wherein said coupling means includes means for releasably clamping said support to the pressure vessel and for retaining said flange in said groove.

4. Apparatus according to claim 3 wherein the pressure vessel is cylindrical, said releasable clamping means including an arcuate extension carried by said support and projecting from the end thereof coupled to the pressure vessel for receiving an end portion of the pressure vessel, and means carried by said extension for clamping the pressure vessel to said extension.

5. Apparatus according to claim 4 wherein said means for clamping the pressure vessel to said extension includes a pair of clamp elements respectively pivotally secured to opposite sides of said extension together with means carried by said elements for releasably securing said elements one to the other.

6. Apparatus according to claim 4 wherein said flange is radially inwardly projecting and is carried by said extension for engagement in the groove of the pressure vessel.

7. In a reverse osmosis system having an elongated, generally cylindrical, pressure vessel for receiving modules, said vessel being open at opposite ends and having a groove adjacent at least one of said ends, a pair of end caps and means for releasably securing said end caps to respective opposite ends of said vessel, the improvement comprising: a module handling device including a frame, an elongated support carried by said frame for receiving a module, a pusher element carried by said frame for movement between a first position adjacent one end of said support and a second position adjacent the opposite end of said support, means for coupling the opposite end of said support to said pressure vessel at an open end thereof having a groove adjacent thereto, said coupling means including a boss carried by said support and engageable in said groove to prevent relative endwise movement of said support and said vessel, and means for moving said pusher element from said first position to said second position to push the module along said support and into said pressure vessel through the open end thereof coupled to said support.

8. The system according to claim 7, wherein said means for moving said pusher element includes a cylinder carried by said frame, said cylinder containing a fluid actuated piston.

9. The system according to claim 8, wherein said coupling means includes means for releasably clamping said support to the pressure vessel and for retaining said boss in said groove.

10. The system according to claim 9, wherein said releasable clamping means includes an arcuate extension carried by said support and projecting from the end thereof coupled to the pressure vessel for receiving an end portion of the pressure vessel, and means carried by said extension for clamping said pressure vessel to said extension.

11. The system according to claim 10, wherein said means for clamping the pressure vessel to said extension includes a pair of clamp elements respectively pivotally secured to opposite sides of said extension together with means carried by said elements for releasably securing said elements one to the other.

12. The system of claim 7 wherein said support further comprises a generally semicylindrical end section for receiving the end of said cylindrical pressure vessel, said boss being radially inwardly projecting and carried by said support section for engagement in said groove.

* * * * *